Jan. 3, 1956   G. SLAYTER ET AL   2,729,027
APPARATUS FOR ATTENUATING GLASS AND SIMILAR FIBERS
Filed Nov. 22, 1950   3 Sheets-Sheet 1
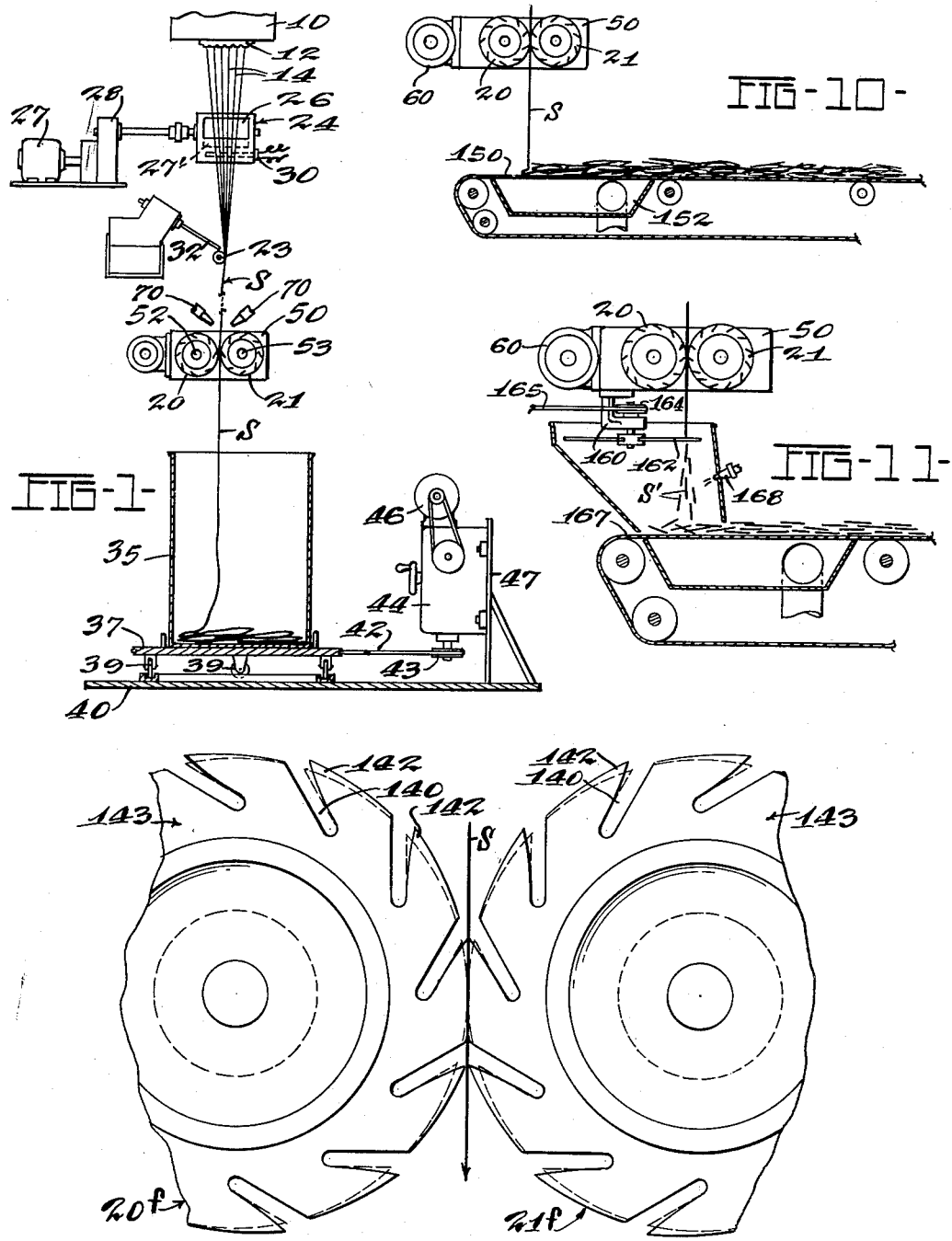
Inventors:
GAMES SLAYTER,
ED FLETCHER.
By
Staelin & Overman
Attorneys

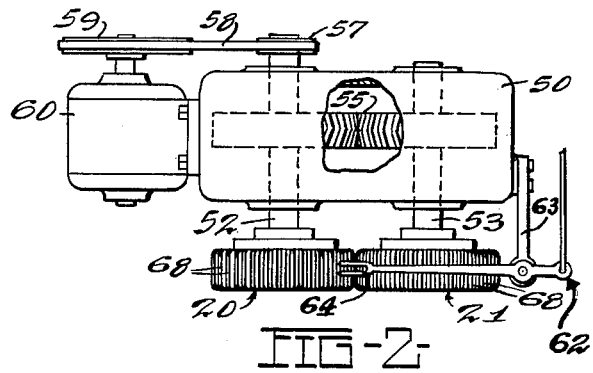
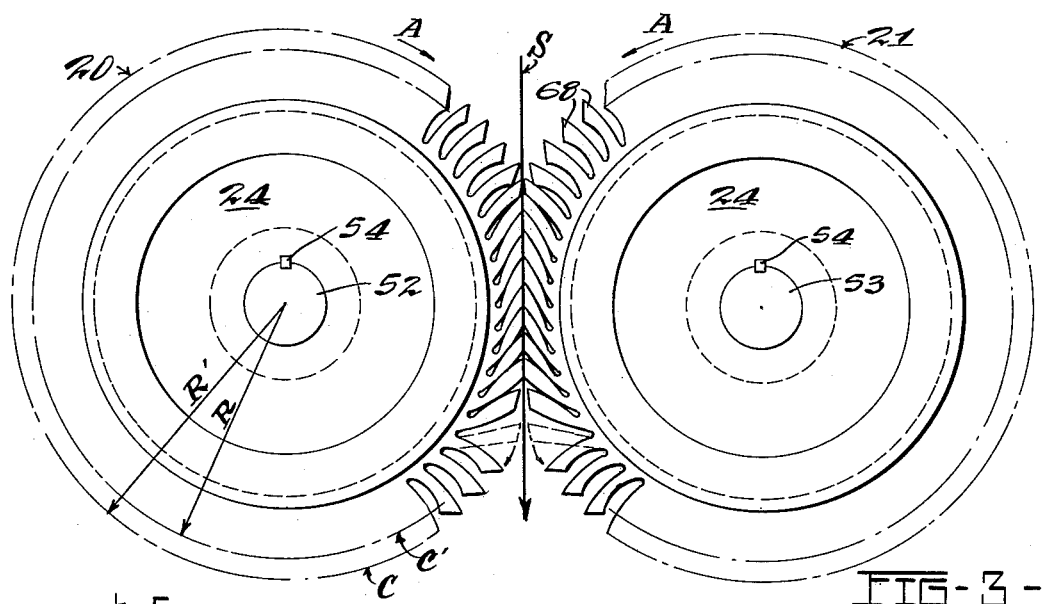
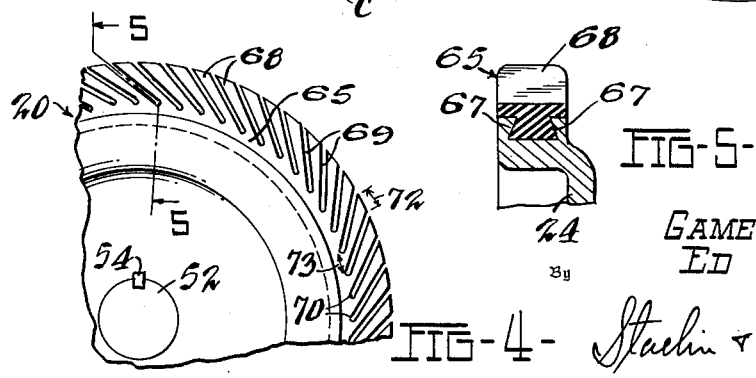
Inventors:
GAMES SLAYTER,
ED FLETCHER.

Jan. 3, 1956 G. SLAYTER ET AL 2,729,027
APPARATUS FOR ATTENUATING GLASS AND SIMILAR FIBERS
Filed Nov. 22, 1950 3 Sheets-Sheet 3
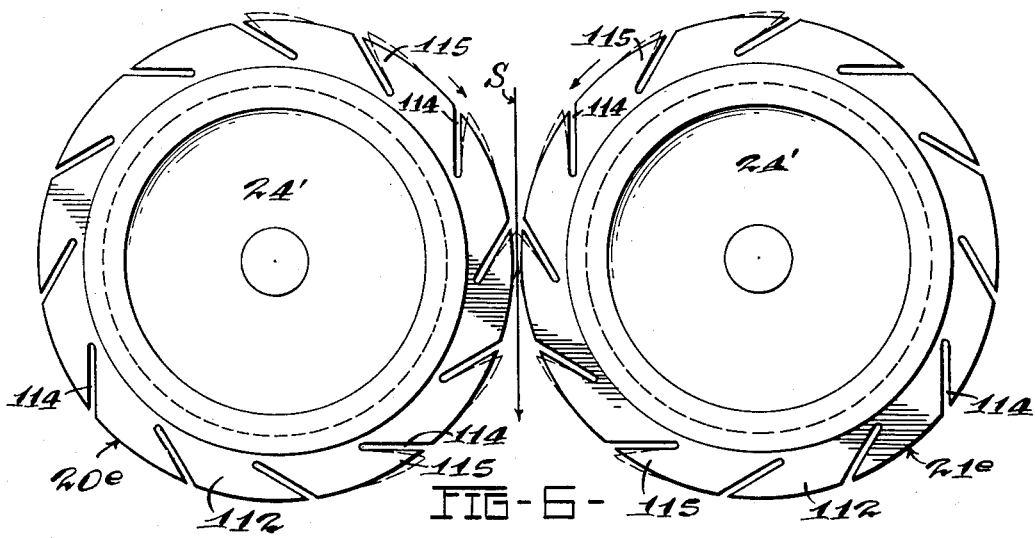
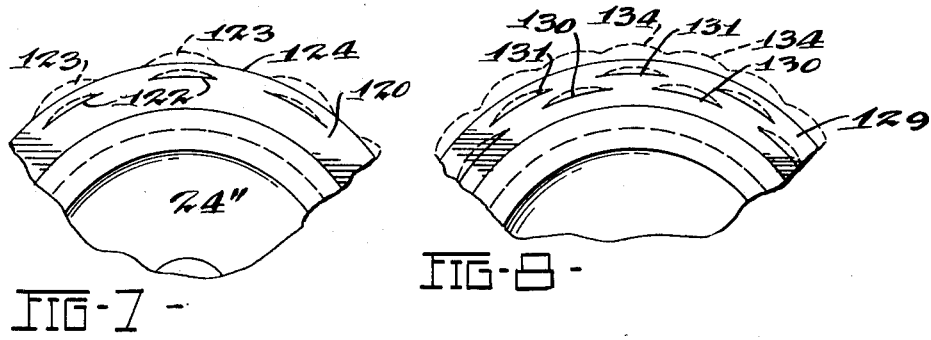
Inventors:
GAMES SLAYTER,
ED FLETCHER.
By Staelin & Overman
Attorneys

United States Patent Office 2,729,027
Patented Jan. 3, 1956

2,729,027

APPARATUS FOR ATTENUATING GLASS AND SIMILAR FIBERS

Games Slayter and Ed Fletcher, Newark, Ohio, assignors to Owens-Corning Fiberglas Corporation, Toledo, Ohio, a corporation of Delaware Application November 22, 1950, Serial No. 197,141

8 Claims. (Cl. 49—17)

This invention relates to apparatus for forming and attenuating fine fibers from fiber forming materials and more especially to a method and apparatus for continuously forming and attenuating fibers of mineral material such as glass and gathering same into continuous strands, linear groups or bundles for use or further processing.

Various methods have been pursued in order to produce fine fibers from thermofusible or flowable fiber-forming materials such as glass which could be carried on under conditions adaptable for large scale commercial operation for the economical production of fibers. In order to render the production of fine fibers from flowable materials competitive with conventional textile materials, the fiber-forming materials must be of a character readily attenuable to an extremely fine fiber or filament formation at comparatively high speeds of attenuation.

The production of continuous slivers, strands or linear groups of continuous fibers carried on by heretofore known methods and apparatus has presented certain difficulties, particularly when high speed fiber attenuation is attempted. One method of producing continuous strands or linear groups of fibers includes flowing streams of molten or flowable material such as glass from a bushing containing a supply of the fiber-forming material, attenuating the streams to fiber form by a rotating flyer traveling about a cylindrical support whereby linear groups or strands of fibers are collected on the support which is usually of comparatively large diameter. This method of attenuation and collection is usually referred to as a cap winder method. Its use, however, entails certain difficulties in effecting collection of the strands of fibers in continuous form and the apparatus required is expensive and cumbersome.

Another method consists of attenuating streams of molten fiber-forming material by winding the strand of fibers directly upon a horizontally disposed sleeve or cylinder rotating at a high speed, a textile traverse being employed to distribute the strand on the sleeve to form a package. This method, while adaptable for high speed operation, causes a very high pressure to be built up internally in the strand package by reason of the strand tension. Where adhesive agents or binders are applied to the fibers prior to their collection upon the sleeve, the adhesive or binders may be incompletely set, a condition which seriously impairs further processing operations resulting in considerable waste of material.

This method of attenuating and collecting the strand presents a disadvantage in the operation of the method for the reason that the amount of strand in a package is limited, and upon accumulation of a predetermined amount of strand on the sleeve or in the package, an interruption of the fiber attenuation and collection is necessary in order to remove the package of strand and insert a new sleeve or cylinder. In the utilization of such method, especially in the formation of fibers from molten glass, such interruptions in the method not only involve time delays but also interfere with the smooth flow of the streams of molten glass resulting in considerable waste during the time required to change the package sleeves. Furthermore, after each stoppage, some time is required to again attain normal operating conditions to provide for a smooth flow of glass streams and concomitant attenuation of the streams into fibers of a suitable fineness to be utilized commercially.

The several methods heretofore employed in producing strands or slivers of attenuated fibers involve not only operational difficulties of the character above pointed out but at high speeds, expensive equipment has often been necessary in order to satisfactorily produce a commercially usable product.

In all prior methods usable for the commercial production of continuous strands of fibers, the strand had to be wound on to some form of rotating element or sleeve. As the amount of strand that could be accumulated on a spool or sleeve as a strand package was necessarily limited, interruptions were imperative in order to remove the packages of accumulated strand and insert new spools or sleeves. The known usable processes, furthermore, do not provide for accumulation of the continuous strand in a manner presenting a free end of strand so necessary to successfully withdraw or pay out the strand from the package or strand bulk for subsequent processing or handling of the strand.

It has been proposed to utilize a pair of rotating rolls arranged in juxtaposed relation whereby the strand or sliver of fibers would pass between juxtaposed peripheral surfaces of the rolls, the latter providing a pulling or tractive force to attenuate the streams of fiber-forming material into fibers. One difficulty that has heretofore impaired the successful operation of attenuating materials to fine fibers by such means is that at the comparatively high speeds necessary for commercial production, individual or straggling fibers, which may result from fiber breakage or straggling fibers that are insecurely bonded in the strand or linear group of fibers, tend to adhere to and become wound upon the rolls. This action is usually referred to as "licking" and when it occurs, the process must be interrupted, the rolls stopped and the licking fibers removed from the rolls. Licking of the fibers occurs frequently for the reason, among others, that at high speeds of rotation of the rolls, the adjacent or surrounding air tends to follow the peripheries of the rolls which augments the tendency of fibers to adhere or cling to the rolls.

The present invention contemplates a novel apparatus for attenuating fiber-forming materials to fine fibers by a simple yet effective means which eliminates the tendency of fibers to adhere to and become wound upon the attenuating means.

The invention embraces a novel apparatus involving the utilization of fiber engaging and attenuating instrumentalities wherein fiber engaging portions thereof are configurated and arranged to traverse a course in a manner wherein such portions travel at different speeds during each rotation of the instrumentalities while the fibers are caused to travel at a substantially uniform speed whereby adherence of fibers to the instrumentalities is eliminated.

An object of the invention resides in an apparatus for attenuating fiber-forming materials into fine fibers through the engagement of rotatable elements with the fibers in a manner whereby forces are set up during movement of the fibers and rotation of the fiber engaging elements which are effective to divert fibers away from the attenuating elements as the fibers are moved or advanced thereby.

The invention embraces a fiber attenuating apparatus especially adapted for high speed fiber production involving a rotatable fiber engaging means embodying fiber engaging areas continuously moving in a manner whereby the linear speed thereof is rendered nonuniform during each revolution of the means for effecting continuous positive disengagement of the fibers therewith after attenuation.

The invention has for a further object the provision of instrumentalities rotatable at high speeds having peripheral surface areas adapted for resilient engagement with fibers for attenuating and conveying the same to a collecting zone, the fiber engaging surface areas of the rotatable elements being fashioned in a manner to provide a plurality of spaced sections adapted to be deformed or stressed by centrifugal forces whereby such sections in certain radial positions of rotation are rendered effective to direct the attenuated fibers away from the peripheral surface areas of the rotating elements.

Another object of the invention resides in apparatus involving a pair of juxtaposed fiber engaging elements having fiber engaging zones which during engagement thereof with the fibers travel at a lesser linear speed than during the period when they are out of engagement with the fibers being attenuated.

Another object resides in the provision of a pair of rotatable pull rolls having deformable surface portions engageable with fibers for attenuating purposes whereby the surfaces of such elements are acted upon by centrifugal forces set up by high speed rotation of the elements whereby the peripheral surface portions thereof engage the group of fibers in a manner biasing them into engagement with the rotatable elements, the surface portions of the elements biasing the fibers away from engagement with the rotatable elements after the fibers have passed between the elements.

Still another object of the invention is the provision of a simple yet effective apparatus occupying a minimum of space for attenuating and advancing fibers in strand formation, the apparatus being adapted for high speed, continuous operation in a manner whereby the continuous strand of fibers may be collected in a manner avoiding interruption of fiber attenuation.

Still another object of the invention is the provision of a simple yet effective apparatus for attenuating fiber-forming materials into fine fibers which is inexpensive and of a portable nature to facilitate carrying on the process at stations most advantageous in connection with further operations whereby handling of the strand is reduced to a minimum and the materials made from the fibers produced economically.

Still a further object of the invention resides in the provision of a novel apparatus for attenuating fiber-forming materials into fine fibers in linear group or strand formation wherein the strand may be readily collected in various ways depending upon its use or further processing as by directly accumulating the same in a container disposed adjacent the attenuating device so that the strand forms its own package from which it may be subsequently and easily withdrawn from the container, by collecting the continuous strand on a moving conveyor or by reducing the strand to short lengths for the production of bonded mat or other uses where short length strands are desired.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic view illustrating an arrangement for carrying out the method of attenuating fibers from fiber-forming material and illustrates one method of collecting the attenuated fibers;

Figure 2 is a plan view illustrating a form of driving means for the fiber attenuating and advancing instrumentalities;

Figure 3 is an elevational view illustrating a pair of rotatable fiber attenuating elements having their peripheral portions or sections formed according to the invention and are shown in relative positions attained during high speed rotation;

Figure 4 is a fragmentary view of one of the rotatable elements illustrated in Figure 3 showing the normal position of the peripheral sections thereof in static condition;

Figure 5 is a fragmentary sectional view taken substantially on the line 5—5 of Figure 4 illustrating a method of mounting one of the fiber attenuating instrumentalities;

Figure 6 is an elevational view of a pair of fiber engaging and attenuating elements in which the peripheral surface portions of the elements are serrated to provide deformable fiber engaging portions or sections;

Figure 7 is a fragmentary elevational view illustrating another form of rotatable, deformable fiber engaging instrumentality;

Figure 8 illustrates a further form of deformable fiber engaging instrumentality;

Figure 9 is a view similar to figure 6 illustrating a modified form of peripheral sections of rotatable fiber attenuating means;

Figure 10 is a semidiagrammatic view illustrating a method of collecting a continuous strand of fibers, and;

Figure 11 illustrates a method and means of reducing a continuous strand to short lengths and a method of forming bonded mat therefrom.

The apparatus of the present invention is especially adaptable for forming or attenuating fibers from flowable material such as glass, but the invention is susceptible for use in producing or attenuating fibers from other fiber-forming materials such as fusible minerals, thermo-plastic fiber-forming resins and the like. The invention has particular utility in continuously forming or attenuating fibers in a manner whereby they are assembled or directed into a strand or linear group formation of substantially uniform cross-sectional character as little or no variation in fiber size is encountered when optimum conditions of attenuation are maintained.

The present invention embraces an apparatus for forming and attenuating fibers at high linear speeds rendering the product commercially competitive with other types of fibers. The apparatus provides for the formation of continuous fibers assembled in continuous strand or linear group formation processed in a manner whereby collection of the continous strand is facilitated in various ways or the strand concomitantly reduced to short lengths, dependent upon the subsequent use therefor or the character of further processing operations. For example, the continuous strand of fibers may be collected in a container in a manner providing a free end of strand whereby the same may be readily threaded out or withdrawn from the container during subsequent processing operations. This is a valuable feature in that the continuous strand may be directed from the bulk in a container to winding spools or spindles whereby the strand may be wound to form a package particularly suitable for fabricating textiles and the like.

The continuous strand may be subjected to severing or reducing devices as it is projected from the attenuating means when it is desired to utilize predetermined uniform lengths of strand for various purposes as for the production of bonded mat or as reinforcement for molded plastic or resinous articles. The present method and apparatus may be utilized in connection with a movable conveyor, the latter collecting the continuous strand of fibers in a manner to form a desired pattern to produce mats or layers of continuous strand or for reinforcement purposes where continuous strand material provides improved strength characteristics in fabricated articles as, for example, in laminated materials such as paper and the like. The attenuation of the fibers and their collection into a linear group may be carried on in a manner whereby the fibers of the strand are susceptible of collection and accumulation in loose formation forming a fluffy mat of low density endowed with a high degree of resiliency.

One of the major features of the present invention lies in the provision of effective means for preventing the "licking" of the fibers to the attenuating means, i. e., the adherence or cohesion of isolated or straggling fibers to the attenuating instrumentalities, a difficulty encountered in prior endeavors to attenuate fibers at relatively high speeds by moving instrumentalities engageable with the fibers. Through the elimination of the difficulties of fibers adhering to and becoming wound upon the moving attenuating means, the process may be carried on continuously without interruption so that normal operating or optimum conditions of attenuation may be constantly maintained whereby great savings are effected in producing continuous fibers as there is no wastage of fiber-forming material caused by stoppages with the consequent result that a high efficiency of operation is maintained in the continuous production of a commercially acceptable product having a high degree of uniformity and of improved quality.

Referring to the drawings in detail and first to Figure 1, there is illustrated in semidiagrammatic form an arrangement for carrying out the method of the invention. A suitable receptacle or container 10 is adapted to contain a supply or quantity of flowable or molten fiber-forming material such as glass, the receptacle being heated by electrical means or other suitable heating medium. Disposed beneath the supply receptacle 10 is a feeder bushing 12 provided with a comparatively large number of small openings or apertures through which flow streams 14 of the molten or flowable fiber-forming material.

The streams 14 of fiber-forming material are directed into engagement with attenuating instrumentalities 20 and 21 which are preferably of a rotatable character and which simultaneously attenuate the streams 14 to fine continuous fibers which are gathered into a linear group or strand S and advance the same to a collecting zone. The fibers formed through attenuation of the streams 14 are converged or gathered together into a linear group or strand formation by means of a collector 23 which may be in the form of a grooved roll as illustrated or a V-shaped fiber gathering pad.

The continuous linear group of fibers or strand S passes between the moving attenuating instrumentalities 20 and 21 in a manner hereinafter described in further detail, the strand being thereafter subjected to further processing operations or collected in a suitable manner dependent upon the subsequent use or processing of the fibers.

In the formation of the fibers and prior to their being gathered into a linear group or strand, a suitable sizing or coating material may be applied to the individual fibers. As illustrated in Figure 1 in order to provide for the application of sizing material, a receptacle 24, adapted to contain a sizing or coating material preferably of a type readily liquifiable under heat, is equipped with an applicator in the form of a roll 26 journalled in suitable bearings which is driven by a motor 27 through gearing contained in casing 28 whereby the applicator or roll 26 is rotated at a comparatively slow speed. The roll 26 is arranged for engagement with a second roll 27' immersed in the sizing material contained within the receptacle 24 so that a film of the sizing material is continuously formed upon or caused to adhere to the cylindrical surface of the rolls 26 and 27'. An electrically energized heating element 30 may be embodied in the container 24 for maintaining the sizing material in a molten or fluid condition to facilitate its transfer to the applicator roll 26 and thence to the fibers 14.

The roll 26 is disposed in relation to the attenuated fibers whereby the fibers take over or contact a portion of the cylindrical periphery and acquire a coating or film of the sizing material through the wiping action of the fibers engaging the roll.

Various materials or compositions may be used or employed as a coating or sizing for the fibers constituting the strand or linear group. Among the materials that may be employed for such purposes are waxes such as microcrystalline wax, amorphous wax such as ozokerite, montan wax, ceresin wax and other wax-like substances preferably of mineral derivation. Paraffin wax, carnauba wax, beeswax and in addition synthetic waxes such as hydrogenated castor oil are also usable for the purpose.

In addition to the application of a sizing or coating to the fibers or in lieu of such coating a lubricant may be applied to the linear group of fibers adjacent the fiber gathering element 23. If an application of lubricant is desired, a tube 32 connected to a supply of lubricant may be disposed adjacent the fiber gathering element 23 so as to transfer lubricant to the fibers as they engage and pass the fiber gathering and strand forming element.

In some instances it may be desirable to apply a binder or adhesive to the linear group of fibers in order to secure or augment mass integrity of the linear group of fibers and in such instances a binder or adhesive of synthetic or natural resins, rosins, and other heat-softenable materials may be applied through the medium of the roll applicator or at the fiber gathering element 23. It is to be understood that if the fibers in the strand are to be maintained and collected in a more or less loosened relation, the application of a sizing or lubricant may be dispensed with in forming a fluffy mass or mat of low density.

The strand or linear group of attenuated fibers may be collected by various means and methods as hereinafter pointed out. One method is illustrated in Figure 1 wherein the strand S may be fed or projected directly from the attenuating instrumentalities 20 and 21 to an open receptacle or container 35 supported in a manner to be rotated at a comparatively slow speed during the collection or accumulation of the continuous strand in bulk formation in the receptacle. The receptacle may be mounted upon a revoluble platform or table 37 supported on antifriction means such as rollers 39 carried by a supporting plate 40. The platform or table 37 may be provided with a peripheral groove adapted to accommodate a belt 42 connected to a pulley 43 operated through speed reducing gearing contained within a housing 44 and driven by a motor 46 mounted upon a suitable support 47. The axis of rotation of the container 35 is preferably offset with respect to the path of normal travel of the strand as shown in Figure 1 to facilitate more uniform distribution of the strand in the container and to minimize snarling or tangling of the strand.

The attenuating instrumentalities may be actuated or rotated by a suitable means and as particularly shown in Figure 2 the rotating instrumentalities 20 and 21 are respectively supported on shafts 52 and 53 journalled in bearings mounted in a housing or casing 50. The shafts 52 and 53 may be interconnected by suitable gearing 55 whereby the shafts will be rotated at the same speed. One of the shafts, for example, shaft 52 may be provided with a pulley 57 connected by means of a belt 58 with a pulley 59 driven by a suitable motor 60, the pulleys 57 and 59 being of proper diameters so as to rotate the fiber attenuating instrumentalities or rolls 20 and 21 at a comparatively high speed, that is, well above 5,000 linear feet per minute.

In order to minimize wear of the rolls at the locus of engagement with the strand, an oscillating traverse 62 of conventional character may be utilized which is pivotally supported on a bracket 63 and driven by suitable means (not shown). The bifurcated extremity 64 directs the strand between the rolls, and is oscillated in a manner to continuously change the path of the strand moving between the rolls.

An important phase of the present invention embraces a novel principle or method of fiber attenuation employing a novel apparatus in a manner which completely eliminates any tendency for fibers to become wound or adhere to the rotating fiber attenuating instrumentalities.

This principle involves the utilization of moving fiber engaging and attenuating elements capable of traveling at comparatively high linear speeds and particularly configurated for functioning in a manner whereby fiber engaging portions or sections of these elements, when out of engagement with the fibers are influenced by kinetic inertia forces such as centrifugal forces to travel at linear speeds greater than the speed of the portions or sections when in engagement with the strand or linear group of fibers. The attenuating elements are formed and arranged so that as the fiber engaging portions move away from the linear group of fibers being projected or advanced to the collecting zone, the portions or sections immediately change their relative positions and increase in linear speed so that straggling or isolated fibers or fibers that may be insecurely bonded or correlated in the linear group or strand are prevented from adhering to the peripheral surface portions of the elements by reason of the differential in speed between that of the linear group of fibers being attenuated and the speed of the portions or sections when out of engagement with the group of fibers.

Figures 3, 4 and 5 illustrate one form of fiber attenuating instrumentalities or elements fashioned in a manner to perform the functions above mentioned. As illustrated in detail in Figure 3, the fiber attenuating means is inclusive of two rotary elements 20 and 21 which are of substantially identical construction driven in the direction of the arrows A by means of the arrangement shown in Figure 2. Each of the rotary elements is inclusive of a disc-like central body portion 24 preferably fashioned of metal and which is snugly fitted upon its suporting shaft, a key 54 being utilized to establish a positive drive connection between the shaft and the disc-portion 24 of the element.

Mounted upon the periphery of each of the rotor discs 24 is an annular member 65 of deformable or resilient material which may be securely bonded or fastened to the periphery of the disc 24 through the utilization of suitable bonding cement. In addition the periphery of the metal disc 24 may be provided with a peripheral recess having converging side walls as shown at 67 to aid in securing the annular member 65 to the disc 24. The annular members may be formed of semi-hard rubber, synthetic rubber or the like or any material capable of being flexed or deformed for performing the functions necessary in carrying out the method of the present invention.

Figure 4 illustrates a portion of one of the annular members fashioned in a manner to provide a plurality of cleats or fingers 68. The fingers 68 may be formed in any suitable manner as by fashioning a plurality of spaced slots, kerfs or recesses 69 about the entire periphery of each annular member 65, the kerfs being angularly arranged with respect to a plane tangent to the normal periphery of the annular element 65, that is, the plane of each slot or kerf 69 is askew with respect to a plane of tangency at the entrance of the slot on the member 65.

Due to the fact that the bottoms 70 of the slots or kerfs 69 are closer to the axis of rotation of the shaft 52 than the extreme peripheral portions of member 65, the circumferential length of each finger indicated at 72 is of greater dimension than the width of juncture of the finger 68 with the body of the annular member at the zone of attachment as indicated at 73 in Figure 4. This arrangement secures a particular function in the operation of attenuation as the limited joining area 73 of each finger 68 with the body of the annular member provides a degree of flexibility so that during high speed rotation of the attenuating element each finger 68 under the influence of centrifugal force will tend to move outwardly to more nearly attain a radial position with respect to the axis of rotation of the element, a condition illustrated in Figure 3. Thus the fingers 68 when out of engagement with the strand of fibers S assume substantially radial positions with respect to the axis of the shaft supporting the element.

Figure 3 illustrates the positions of the fingers or cleats 68 during rotation of the elements at comparatively high speed and Figure 4 illustrates the normal position of the fingers when the roll is in static position. The shafts 52 supporting the attenuating elements or rolls 20 and 21 are spaced at a distance as illustrated in Figure 3 which will cause the fingers 68, when in maximum contact with the strand fibers, i. e., at the zone of a plane passing through the axes of the shafts, to be distorted in a manner to temporarily and substantially close the kerfs or slots 69 normally separating adjacent pairs of fingers.

Through the distortion of the fingers in the fiber or strand gripping zone, the radial distance R represents the distance of the strand of fibers S from the centers of the shafts 52 and the radial distance R' represents the circular loci or paths of linear traverse for the tips of the fingers 68 after they have moved away from the zone of engagement with the strand and are under the unrestricted influence of centrifugal forces of rotation. Due to the difference in radial distance of the tips of the fingers 68 when distorted into gripping engagement with the strand S as compared with the radial distance R', it will be apparent that the tips of the fingers 68 when unrestricted travel at an increased linear speed as compared with the speed of the tips of the fingers when in engagement with the strand S.

In this manner the strand of fibers moves at a lesser speed than the peripheral extremities or tips of the fingers 68 when distended under centrifugal forces and hence any isolated or straggling fibers or fibers that may be insecurely held in the strand cannot adhere to the peripheries of the attenuating elements 20 or 21 by reason of the difference in linear speed between the finger tips in distended position and in constricted or fiber engaging position. Hence, the operation of attenuating the streams of molten material into fine fibers may be continuously carried on without interruption because the tendency of the fibers to adhere to the rotating elements is completely eliminated. With attenuating instrumentalities of this character, linear speeds of the fibers may be had upwards of more than 5,000 feet per minute, the attenuating speeds being limited only by the strength factors in the rotating elements to resist fracture and destructive stresses set up by the centrifugal forces of rotation.

Another beneficial result obtained through the utilization of fiber attenuating instrumentalities of the character shown in Figure 3 is that the fingers 68, in progressing into contact with the strand S, are in radially distended relation under the influence of centrifugal force and, in effect, reach out and contact or grip the fibers at a substantial distance in advance of the plane through the axes of the shafts 52. This action of the fingers as shown in Figure 3 provides a rectilinear zone wherein the fibers are under the gripping or retentive force of the fingers as centrifugal force is effective to foster close engagement of the fingers 68 with each other and with the strand S as the strand moves between the attenuating instrumentalities 20 and 21.

As the strand S is securely gripped between groups of fingers in the zone of the plane through the axis of the shafts 52, slippage of the strand is reduced to a minimum or entirely eliminated. The fingers in moving away from fiber gripping position perform another important function. As soon as the fingers move away from the maximum point of fiber engagement, centrifugal forces tend to restore or distend them to their extreme radial positions thus increasing the relative speed of the tips of the fingers, such increased speed tending to push the strand from the fingers. This factor is not only effective in preventing fibers from accumulating or becoming wound upon the instrumentalities but also aids in projecting the strand toward the collecting zone. The flexible fingers or cleats 68 provide a means for aiding in cooling the annular element 65 as their relative flexure agitates the air adjacent the fiber gripping zone.

The instant invention secures other important and beneficial results. The strand S is conveyed or projected by the rotation of the attenuating instrumentalities in a tangential direction relative to the strand engaging zone of the rolls which action facilitates collection of the strand in many ways. For example, the strand may be collected in an open receptacle in the manner illustrated in Figure 1 and in other ways as hereinafter pointed out. As the fibers are attenuated in a manner which eliminates any influence of centrifugal forces upon the direction of strand travel, there is no tendency for the binder or adhesive in the strand to become maldistributed as the strand may be collected without being wound into a cylindrical package. Hence the strand is not subjected to tension or pressure through package winding, a condition which has heretofore seriously impaired further processing of strand material. Furthermore the prior method of forming fibers by winding the strand of fibers on a rotating sleeve has the disadvantage that as the package enlarges during winding, the fibers are formed at a constantly increasing speed and hence the diameter of each fiber tends to be gradually reduced in size. In the present arrangement, the heat softenable, fiber-forming material is attenuated to fiber form at a more constant speed so that variations in size of the fibers along their length are less likely to occur.

The feeding of the strand S into a receptacle provides a method of collection wherein a free end of the strand may be paid out or withdrawn from the receptacle for further processing without any interbonding or adhesion of the swirls or loops of the strand formed during its collection in the receptacle. A factor which facilitates and provides this benefit is that the wax coating or bonding material on the strand is not subjected to centrifugal forces or pressures which would tend to cause an interbonding of successive convolutions when attenuated by winding in cylindrical package formation.

The initial positioning of the elements 20 and 21 in adjacent relation may be of a nature which best secures the frictional gripping with the strand to provide for advancing the strand for attenuating the fibers with a minimum of compression of the flexible fingers 68. Thus it has been found that the positioning of the shafts 52 at a spacing wherein the fingers are flexed to substantially close the kerfs between adjacent fingers without compressing the fingers as shown in Figure 3 provides a very satisfactory gripping engagement with the strand. Such relative positioning of the fiber attenuating instrumentalities is desirable in order to minimize heating by reason of the successive flexing of the fingers at high speeds.

Under certain conditions or speeds of operation it may be desirable to space the shafts 52 at a greater distance so that when the elements are in static condition the tips of the lugs or fingers 68 are just out of engagement. With this type of spacing for the instrumentalities, the forces causing the fingers to grip the strand are entirely centrifugal and have been found to function satisfactorily for most attenuating operations. Thus the radially acting centrifugal forces are utilized to obtain an attenuating engagement with the fibers in contradistinction to a compression of the fiber engaging means with a consequent prolongation of the life of the rolls.

If it is desired to more effectively radiate heat which may be formed by flexure of the fingers away from the attenuating instrumentalities, jets 70 as shown in Figure 1 may be provided adjacent the rolls for the purpose of directing streams of air under pressure against the peripheries of the elements, or a blower or suction means may be provided with shrouds terminating adjacent the rotor elements for creating a moving air stream for cooling purposes.

Figure 6 illustrates a form of the invention which is similar in nature to that illustrated in Figure 3. In this form of the invention, however, the roll elements 20e and 21e are inclusive of metal discs 24' each of which supports at its periphery an annular member 112 of resilient or deformable material, the peripheral zones of which are adapted to engage a strand S of fibers for attenuation purposes. In this form the annular members 112 are provided with spaced slots or kerfs 114 forming spaced lugs between the pairs of slots. The slots are spaced at a greater distance apart than those illustrated in the form of the invention shown in Figure 3 and are angularly disposed or aslant with respect to tangent planes of the periphery in order to form acute angular portions or sections 115. The angles of the slots 114 are so fashioned in the deformable annular members 112 that the portions 115 are readily distorted by centrifugal forces during rotation of the attenuating instrumentalities whereby they are stretched outwardly as indicated in dotted lines in Figure 6. Through this arrangement the finger portions or sections 115 under the influence of centrifugal force when the rotors are being revolved in the direction of the arrows engage with the strand S for a considerable rectilinear distance of travel of the strand. The extremities of the projections 115 under the influence of centrifugal force are spaced radially from the axis of rotation a greater distance than when they are in engagement with the strand S and are deformed and distorted by their interengagement to grip the strand S. Thus in this form of the invention, like the other forms hereinbefore described, peripheral portions of the rolls move at greater linear speeds throughout the major portion of each revolution than the strand and hence there is no tendency to licking of the fibers upon the rolls.

Figure 7 illustrates a modified form of attenuating instrumentality wherein a deformable annular band 120 mounted upon a metal disc 24" is provided with an annular row of severed zones or slits 122 which permit portions 123 of the deformable band 120 to move outwardly under centrifugal force forming raised lands which move at a greater linear speed than that of the normal periphery 124. As rolls of this character engage the fibers or strand of fibers in the same manner as the other forms of the invention, the raised portions or lands 123 prevent the adherence or licking of fibers to the periphery of the member or band 120.

Figure 8 illustrates a form of the invention similar to that illustrated in Figure 7 with the modification that there are two annular rows of severed zones or slits designated 130 and 131, the slits of one row being in staggered relation to those in the other row. The slits in the deformable annular band 129, under the action of centrifugal forces of rotation, causes the portions adjacent the slits to be flexed outwardly forming projections or lands 134, which travel at a greater linear speed than that portion of the periphery in a zone of engagement with a strand of fibers wherein the portions 134 are distorted to their normal position by interengagement and therefore move at a lesser speed than when they are traveling under the unrestricted influence of centrifugal forces. The operation of this form is the same as the other forms whereby tendency of fibers to become wound upon the rolls is eliminated.

Figure 9 illustrates a modified configuration of attenuating rolls of the general character of those shown in Figure 6. In this form, the rolls 20f and 21f are provided with slots 140 forming the peripheral sections 142 in the resilient or deformable annular members 143, the slots being of greater width than those in the construction shown in Figure 6. This structural arrangement provides a plurality of strand engaging sections or fingers 142 which are adapted for substantial outward or radial movement under the influence of centrifugal forces. The action of the fiber engaging sections 142 is substantially the same as the other forms of apparatus disclosed in performing fiber attenuating operations. The sections 142, by reason of the wider slot configuration, are capable of substantial relative movement during rotation and deformation thereof at the fiber engaging zone and are effective to set up substantial movement of the surrounding air layer to facilitate the radiation of heat from the annular members 143.

The fiber attenuating method of the apparatus of the present invention facilitates the collection of the fibers in various ways as well as the reduction of fibers to short lengths. Figure 10 is illustrative of an arrangement for collecting the continuous strand or sliver of fibers upon a movable conveyor. In this form of collection, the strand S is projected onto a moving conveyor 150 which may be of the endless belt type of foraminous character for conveying the strand from the collecting zone. If desired the conveyor may be arranged for transverse oscillatory movement for concomitantly distributing the strand in a lateral direction as the conveyor moves in a longitudinal direction. A suction chamber 152 may be disposed beneath the conveyor at the collection zone for establishing subatmospheric pressure to facilitate collection and retention of the strand on the conveyor.

Figure 11 illustrates a method and means for processing the strand of fibers as it is projected from the attenuating instrumentalities to reduce or sever the strand to short lengths. Disposed beneath the housing carrying the fiber attenuating instrumentalities is a bracket 160 which journally supports a strand severing bar or knife 162 adapted for rotation about a vertical axis. The knife 162 may be driven by suitable means such as a pulley 164 driven by a motor (not shown) through the medium of a belt 165. The rotating knife is disposed to impinge upon and sever the downwardly moving strand into short lengths or sections S'. By correlating or varying the speed of rotation of the severing means with the linear speed of the strand, severed strand sections may be produced of desired lengths. The severed strand sections may be collected in mat formation upon a foraminous conveyor 167 or other suitable means for moving the collected strand lengths from the collecting zone. If an integrated mat formed of the short strands is desired, a binder such as a conventionally used resin may be directed onto the accumulated strands by jets or applicators 168.

In the various forms of novel apparatus disclosed, centrifugal forces of rotation are utilized to establish adequate engagement of the rolls with the strand or sliver of fibers. As the attenuating instrumentalities are provided with deformable or resilient zones or elements radially movable under the influence of centrifugal or kinetic forces of rotation or movement, such radial movements may be of sufficient magnitude that the peripheries may be normally spaced slightly apart in static condition. Thus centrifugal forces provide the major, or in certain spacings of the rolls, the sole force establishing a gripping engagement with the strand. It is to be understood that the initial spacing of the rolls may be modified dependent upon the characteristics of deformability of the material utilized for engaging and gripping the strand and the speed of rotation of the rolls in order to secure the most efficient and effective attenuating engagement without crushing the fibers or incurring slippage between the roll surfaces and the strand. In the forms utilizing annular fiber engaging members of deformable or resilient material, the peripheral edges are rounded or chamfered as shown in Figures 2 and 5. The rounding of the edges of the rolls serves dual functions. It facilitates the entrance of the fibers into contact with the rolls during starting of attenuation as the rolls are first brought up to desired speed before the operator brings the strand or linear group of fibers between the rolls. Furthermore by rounding the edges, the strand, on initially moving into the rolls is gripped under light pressure which admits of a degree of slippage. As the fibers move into increased frictional engagement with the rolls, the fibers are gradually accelerated in speed, and breakage, due to sudden shock or inertia, is virtually eliminated.

From the foregoing it will be apparent that the invention provides a simple yet highly efficient apparatus for the commercial production of strands of continuous fine fibers wherein fiber attenuation progresses without interruption and wherein licking or adherence of fibers to the attenuating and strand conveying instrumentalities is entirely eliminated. The apparatus enables the collection of the strand in various ways and more especially it provides for a free end of strand so desirable in carrying on further processing operations. Furthermore the apparatus being adaptable for continuous operation, effects extensive saving in the production of continuous strand of fine fibers by reason of the use of inexpensive equipment and elimination of waste of glass encountered in the operation of prior processes.

We claim:

1. Apparatus for advancing a strand of fibers including, in combination, a pair of rotatable members provided with peripherally disposed elements formed of deformable material; each of said elements being formed with a plurality of spaced slots angularly arranged about the peripheries of said elements providing flexible fiber engaging sections, means for driving said members at speeds whereby centrifugal forces distend said sections outwardly radially of the axes of rotation of said elements; said elements being disposed whereby adjacent peripheral sections thereof are successively interengaged by centrifugal forces during rotation to establish a rectilinear zone of contact with a strand of fibers for advancing the latter.

2. Apparatus of the character disclosed, in combination, a support; a pair of shafts journalled upon the support; fiber engaging elements supported upon each of the shafts; means for simultaneously driving the rotating elements in opposite directions; each of said rotating elements being formed of deformable material and configurated to provide circumferentially spaced flexible cleats, said cleats being shaped whereby portions thereof are arranged to move outwardly radially under the influence of centrifugal forces of rotation; said elements being positioned whereby the cleats are successively engaged during rotation providing a fiber gripping zone, the engagement of the cleats with the fibers being of a character whereby the fibers moved by the cleats through the fiber engaging zone travel at a linear speed less than the linear peripheral speed of the extremities of the cleats when the latter are radially distended by centrifugal forces.

3. Apparatus for attenuating and linearly feeding a continuous, untwisted, mutifilament strand, said apparatus comprising, a pair of rotatable members, each of said members consisting of a hub section and a rim section, the rim section having a circumferentially spaced series of openings extending axially through said rim section and defining a circumferentially extending series of movable elements, the peripheral surfaces of said elements being unbroken axially, said rim section and said elements being flexible and each of said elements being operatively integral with said rim section at at least one end of said element, each of said elements having at least a portion located radially exteriorly of the opening defining one of its sides; said members being mounted on parallel axes so spaced that when under centrifugal force caused by rotation thereof said elements on said members expand radially into contact along a linear zone perpendicular to the common plane of their axes; and means for rotating said members at high speed.

4. Apparatus for attenuating and linearly feeding a continuous, untwisted, multifilament strand, said apparatus comprising, a pair of rotatable peripherally co-active members, each of said members consisting of a hub section and a rim section, the rim section having a circumferentially spaced series of openings extending axially through said rim section and defining a circumferentially extending series of movable elements, the peripheral surfaces of said elements being unbroken axially, said rim section and said elements being flexible and each of said elements being operatively integral with said rim section at at least one end of said element, each of said elements having at least a portion located radially exteriorly of the opening defining one of its sides; said elements being outwardly moved by centrifugal force to increase the effective diameters of said members; said members being mounted on parallel axes spaced a distance less than the expanded diameter of one of said members; and means for rotating said members at high speed.

5. Apparatus for attenuating and linearly feeding a continuous, untwisted, multifilament strand, said apparatus comprising, a pair of rotatable peripherally co-acting members, each of said members consisting of a hub section and a rim section, the rim section having a circumferentially spaced series of openings extending axially through said rim section and defining a circumferentially extending series of movable elements, the peripheral surfaces of said elements being unbroken axially, said rim section and said elements being flexible and each of said elements being operatively integral with said rim section at only one end of said element, each of said elements having at least a portion located radially exteriorly of the opening defining one of its sides; said elements being outwardly moved by centrifugal force to increase the effective diameters of said members; said members being mounted on parallel axes spaced a distance less than the expanded diameter of one of said members; and means for rotating said members at high speed.

6. Apparatus for attenuating and linearly feeding a continuous, untwisted, multifilament strand, said apparatus comprising, a pair of rotatable peripherally co-acting members, each of said members consisting of a hub section and a rim section, the rim section having a circumferentially spaced series of openings extending axially through said rim section and defining a circumferentially extending series of movable elements, the peripheral surfaces of said elements being unbroken axially, said rim section and said elements being flexible and each of said elements being operatively integral with said rim section at at least one end of said element, each of said elements having at least a portion located radially exteriorly of the opening defining one of its sides; said elements being outwardly moved by centrifugal force when rotated at high speed to increase the effective diameters of said members to a size greater than the diameters of said members when stationary; said members being mounted on parallel axes spaced a distance less than the expanded diameter of one of said members; and means for rotating said members at high speed.

7. In a material attenuating apparatus, opposed rotatable elements spaced under static conditions at adjacent regions and defining a material receiving gap therebetween, each element formed of relatively readily expansible substance having a plurality of peripheral floating segments each elongated circumferentially of the element and anchored at each end and having a thin section intermediate its ends formed and arranged to bulge outwardly farther than any other section of the segment during rotation of the element to close the gap and engage the material entered therebetween.

8. In a material attenuating apparatus, opposed rotatable elements spaced under static conditions at adjacent regions and defining a material receiving gap therebetween, each element formed of relatively readily expansible substance having a plurality of peripheral floating segments each elongated circumferentially of the element and anchored at at least one end and having a thin section formed and arranged to bulge outwardly farther than any other section of the segment during rotation of the element to close the gap and engage the material entered therebetween.

References Cited in the file of this patent

UNITED STATES PATENTS

| Number | Name | Date |
|---|---|---|
| 474,030 | Richards | May 3, 1892 |
| 1,384,806 | Reed | July 19, 1921 |
| 1,405,161 | Reed | Jan. 31, 1922 |
| 1,809,251 | Pflimlin | June 9, 1931 |
| 2,160,001 | Saborsky | May 30, 1939 |
| 2,224,149 | Fisher | Dec. 10, 1940 |
| 2,230,272 | Slayter | Feb. 4, 1941 |
| 2,339,590 | Thomas | Jan. 18, 1944 |
| 2,347,036 | Dumont | Apr. 18, 1944 |
| 2,418,873 | Fletcher et al. | Apr. 15, 1947 |
| 2,434,963 | Schmidt | Jan. 27, 1948 |
| 2,457,777 | Holtschulte et al. | Dec. 28, 1948 |
| 2,466,348 | Ambye | Apr. 5, 1949 |
| 2,628,834 | Craib | Feb. 17, 1953 |

FOREIGN PATENTS

| Number | Country | Date |
|---|---|---|
| 258,649 | Switzerland | May 2, 1949 |
| 304,098 | Great Britain | Jan. 17, 1929 |
| 395,378 | Great Britain | July 10, 1933 |

OTHER REFERENCES

Serial No. 352,364, Dumont (A. P. C.), published April 27, 1943.